United States Patent [19]

Kaiser et al.

[11] Patent Number: 5,430,442

[45] Date of Patent: * Jul. 4, 1995

[54] CROSS POINT SWITCH WITH DISTRIBUTED CONTROL

[75] Inventors: John M. Kaiser, Cedar Park; Loyal D. Youngblood, Austin, both of Tex.

[73] Assignee: International Business Machines Corporation, Armonk, N.Y.

[ * ] Notice: The portion of the term of this patent subsequent to Jan. 26, 2010 has been disclaimed.

[21] Appl. No.: 250,996

[22] Filed: May 31, 1994

Related U.S. Application Data

[63] Continuation of Ser. No. 874,999, Apr. 24, 1992, abandoned, which is a continuation of Ser. No. 629,511, Dec. 18, 1990, abandoned.

[51] Int. Cl.$^6$ .............................................. H04Q 3/00
[52] U.S. Cl. ........................... 340/825.79; 340/825.5
[58] Field of Search ........... 340/825.79, 825.5, 825.89, 340/825.02, 826; 370/85.11, 85.13, 85.6, 85.1, 94.1, 94.2, 94.3, 58.1, 58.2, 58.3, 60, 60.1, 67, 68; 364/927.95, 929.1, 935.4, 935.41, 935.43, 935.44, 935.6, 940.65, 940.68, 238.1, 240.2, 240.4, 240.7, 241.9, 242.92, 229.4

[56] References Cited

U.S. PATENT DOCUMENTS

| | | | |
|---|---|---|---|
| 4,363,093 | 12/1982 | Davis et al. | 364/200 |
| 4,580,011 | 4/1986 | Glaser | 379/10 |
| 4,586,175 | 4/1986 | Bedard et al. | 370/85 |
| 4,630,045 | 12/1986 | Georgiou | 340/825 |
| 4,630,258 | 12/1986 | McMillen et al. | 370/60 |
| 4,631,534 | 12/1986 | Franklin et al. | 340/825 |
| 4,695,999 | 9/1987 | Lebizay | 370/58 |
| 4,704,606 | 11/1987 | Hasley | 340/825 |
| 4,752,777 | 6/1988 | Franaszek | 340/825 |
| 4,773,069 | 9/1988 | Boulton et al. | 371/7 |
| 4,805,168 | 2/1989 | Kato | 370/85.11 |
| 4,814,762 | 3/1989 | Franaszek | 340/825 |
| 4,821,170 | 4/1989 | Bernick et al. | 364/200 |
| 4,845,722 | 7/1989 | Kent et al. | 370/58 |
| 4,929,939 | 5/1990 | Varma et al. | 340/825.79 |
| 4,929,940 | 5/1990 | Franaszek et al. | 340/825.79 |
| 5,072,217 | 12/1991 | Georgiou et al. | 340/825.79 |
| 5,144,293 | 9/1992 | Rouse | 340/825.02 |
| 5,179,669 | 1/1993 | Peters | 370/68 |
| 5,182,554 | 1/1993 | Kaiser et al. | 340/826 |

FOREIGN PATENT DOCUMENTS

| | | |
|---|---|---|
| 0373161 | 12/1987 | European Pat. Off. . |
| 0276076 | 1/1988 | European Pat. Off. . |
| 0356110 | 8/1989 | European Pat. Off. . |

OTHER PUBLICATIONS

IBM Technical Disclosure Bulletin, vol. 28, No. 2, Jul. 1985, pp. 510–512, "Fast Set-up Time Circuit Switch With Distributed Control".

IBM Technical Disclosure Bulletin, vol. 29, No. 3, Aug. 1986, pp. 1356–1360, "Dynamically Reconfigurable Integrated Switch".

IBM Technical Disclosure Bulletin, vol. 32, No. 1, Jun. 1989, pp. 427–433, "Control Mechanism for a Packet Bus Communcation Controller".

(List continued on next page.)

Primary Examiner—Donald J. Yusko
Assistant Examiner—Edwin C. Holloway, III
Attorney, Agent, or Firm—Thomas E. Tyson; Paul S. Drake

[57] ABSTRACT

A communications network including several ports where each port is connected to at least one data processing system element. The ports are interconnected by an information bus. Additionally, the ports are connected to a matrix switch that has the capability of providing a direct communications channel between any two of the ports. Each port includes control circuitry for communicating with other ports over the bus and through the bus, regulating the matrix switch in order for the matrix switch to provide the direct communication channels between two ports.

17 Claims, 10 Drawing Sheets

OTHER PUBLICATIONS

IBM Technical Disclosure Bulletin, vol. 20, No. 2, Jul. 1977, pp. 816–817, "Crosspoint Switch for ATS".

IBM Technical Disclosure Bulletin, vol. 29, No. 4, Sep. 1986, pp. 1769–1770, "Race Resolution in TDM Any-to-Any Path Connections in a Space Division Switch".

IBM Technical Disclosure Bulletin, vol. 27, No. 4B, Sep. 1984, pp. 2704–2708, "Variable Configuration Hybrid Space and Packet Switching Network".

IBM Technical Disclosure Bulletin, vol. 24, No. 7A, Dec. 1981, pp. 3352–3356, "Multipath Channel-to-Channel Adapter Cross-Point Switch".

IBM Technical Disclosure Bulletin, vol. 28, No. 8, Jan. 1986, pp. 3272–3273, "Parallel Processor Architecture to Control Multiple Independent Telecommunications Switching Nodes".

IBM Technical Disclosure Bulletin, vol. 25, No. 7A, Dec. 1982, pp.3 578–3582, "Data Base Control and Processing System".

IBM Technical Disclosure Bulletin, vol. 29, No. 7, Dec. 1986, pp. 3070–3072, "Rotary Switch".

IBM Technical Disclosure Bulletin, vol. 30, No. 1, Jun. 1987, pp. 403–405, "Dynamic Time Slot Assignment Architecture for a Digital Telephone Switch".

IBM Technical Disclosure Bulletin, vol. 11, No. 10, Mar. 1969, pp. 1231–1232, "Interconnection Control Networks".

Citation A. Japanese Patent Laid-Open Pub. No. 1044/1976.

Citation B. Japanese Patent Laid-Open Pub. No. 151661/1983.

PORT ADAPTER LOGIC FLOW

MATRIX SWITCH LOGIC

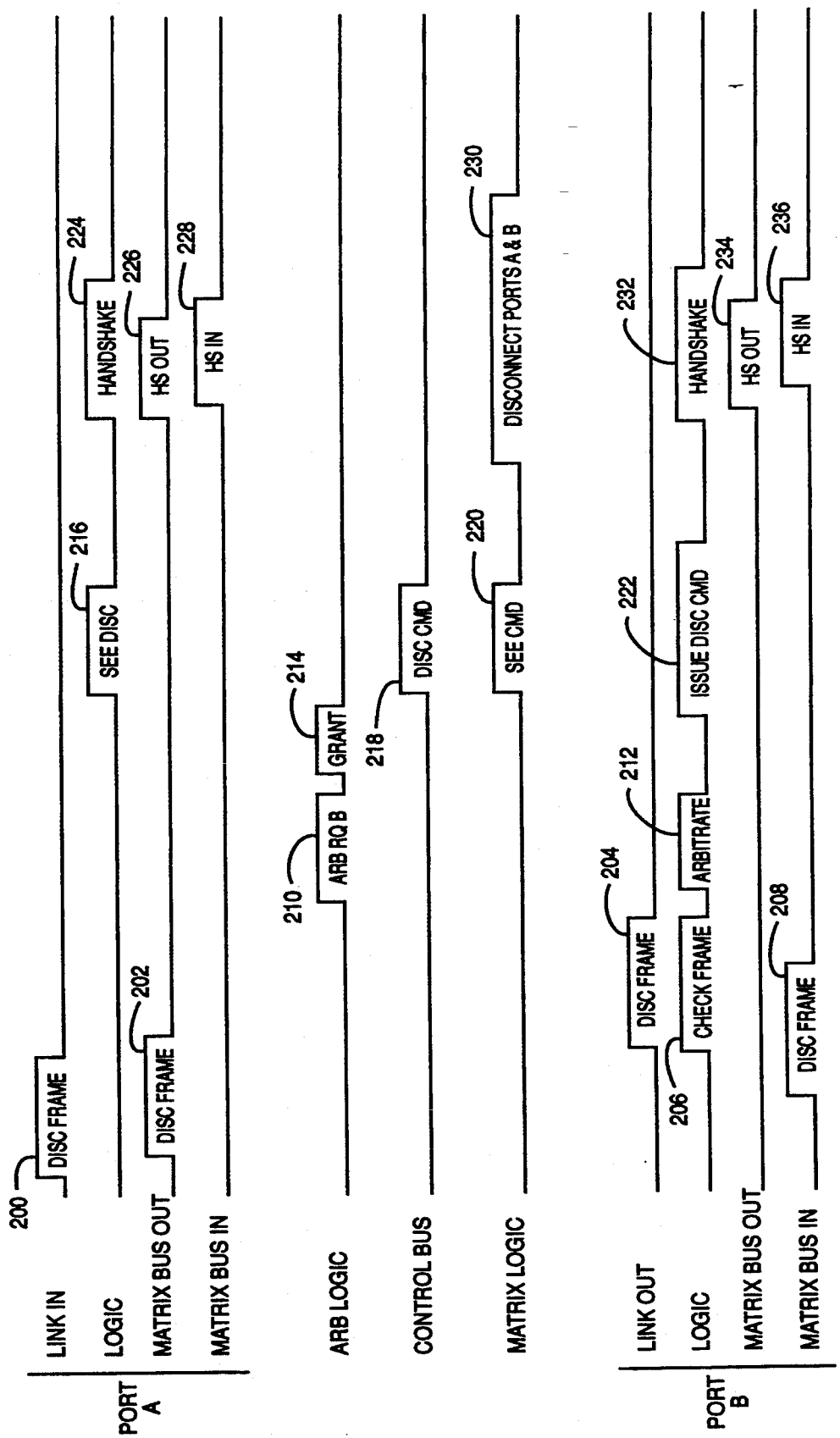
FIG. 5B  DISCONNECT SCENARIO

CONNECTING PORT STATE MACHINE

CONNECTED TO PORT STATE MACHINE

CONNECTED PORT STATE MACHINE

MATRIX SWITCH STATE MACHINE

CROSS POINT SWITCH WITH DISTRIBUTED CONTROL

This is a continuation of application Ser. No. 07/874,999 filed Apr. 24, 1992, which is abandoned, which is a continuation of Ser. No. 07/629,511, filed Dec. 18, 1990, which is also abandoned.

RELATED PATENT APPLICATIONS

This application is related to copending U.S. patent application Ser. No. 07/629,864, now U.S. Pat. No. 5,182,544 filed Dec. 18, 1990 and copending U.S. patent application Ser. No. 07/629,748, now U.S. Pat. No. 5,144,293 filed Dec. 18, 1990.

TECHNICAL FIELD

This invention relates to information transfer and, more specifically, to the simultaneous transfer of information between different data processing systems using a cross point switch.

BACKGROUND ART

Data processing systems require information transfer between data processing system components. There are several methods to provide information transfer within data processing systems. One method that is very advantageous is to simultaneously transfer information between several data processing system elements by using a cross point switch. An example of a cross point switch is illustrated in U.S. Pat. No. 4,630,045, entitled "Controller for a cross Point Switching Matrix". A cross point switch provides simultaneous communication connections between pairs of data processing system elements so that several of these connected pairs may exchange information at the same time through the switch. The cross point switch in U.S. Pat. No. 4,630,045 illustrates the prior art implementation of a cross point switch, whereby the ports of the cross point switch that are connected to the data processing elements are interconnected to a switching matrix and a centralized control circuit which governs the operations of the ports and their interconnection through the switch matrix itself.

U.S. Pat. No. 4,814,762, entitled "Delta Network Control of a Cross Point Switch", illustrates another embodiment of a cross point switch where the actual communications between the ports of a cross point switch are contained in a delta network. According to the teachings of this patent, when a port is attempting to access another port it sends a request message for the specified connection over the delta network. This communication takes place outside of the cross point switch itself. The present invention is intended to provide communications through the cross point switch and, thus, provides inband communication for not only the data transfer but also for specifying the interconnections desired.

U.S. Pat. No. 4,752,777, entitled "Delta Network of a Cross Point Switch", is a continuation of the parent application for U.S. Pat. No. 4,814,762 and teaches the delta network for control of cross point switch ports.

U.S. Pat. No. 4,695,999, entitled "Cross Point Switch of Multiple Autonomous Planes", discloses a multi-planed cross point switch. However, the control of ports connected to the cross point switch is disclosed by this patent.

U.S. Pat. No. 4,845,722, entitled "Computer Interconnect Coupler Employing Cross Bar Switching", discloses an interconnect coupler system that includes a centralized switch logic circuit for controlling the switch matrix.

U.S. Pat. No. 4,580,011, entitled "Distributed Processing Telephone Switching System", discloses a switching system having a centralized controller that receives control signals from the line couplers to direct interconnection through a cross point switching matrix.

IBM Technical Disclosure Bulletin, Vol. 28, No. 2, Jul., 1985, pp. 510-512, entitled "Fast Set-Up Time Circuit Switch With Distributed Control", discloses a switch matrix control system having ports that communicate with a central management controller to control the operation of a cross point switch.

IBM Technical Disclosure Bulletin, Vol. 29, No. 3, Aug., 1986, pp. 1356-1360, entitled "Dynamically Reconfigurable Integrated Switch", discloses a reconfigurable switch designed to support multiple networks of different types. This configuration includes a switch controller that controls the access of the ports to the switch.

IBM Technical Disclosure Bulletin, Vol. 32, No. 1, Jun., 1989, pp. 427-433, entitled "Control Mechanism for a Packet Bus Communication Controller", discloses a controller for a packet bus. A packet bus allows only a single transfer of information at a time, as opposed to a cross point switch which allows simultaneous and continuous transfers of information between communicating pairs of system elements.

IBM Technical Disclosure Bulletin, Vol. 20, No. 2, Jul., 1977, pp. 816-817, entitled "Cross Point Switch for ATS", discloses a cross point switch with a controller which regulates port access over a cross point switch.

IBM Technical Disclosure Bulletin, Vol. 29, No. 4, Sep., 1986, pp. 1769-1771, entitled "Race Resolution in TDM Any-To-Any Path Connections in a Space Division Switch", discloses a switch providing "packet-like" communication capability. As discussed previously, packet transmission provides for only a single pair of communications at a time.

IBM Technical Disclosure Bulletin, Vol. 2.7, No. 4B, Sep., 1984, pp. 2704-2708, entitled "Variable Configuration Hybrid Space and Packet Switching Network", discloses a three level switching mechanism for a packet transmission network using central control to establish a path interconnection.

IBM Technical Disclosure Bulletin, Vol. 24, No. 7A, Dec., 1981, pp. 3352-3356, entitled "Multipath Channel-To-Channel Adapter Cross-Point Switch", discloses a centralized control switching mechanism allowing interprocessor communication through input/output channels.

IBM Technical Disclosure Bulletin, Vol. 28, No. 8, Jan., 1986, pp. 3272-3273, entitled "Parallel Processor Architecture to Control Multiple Independent Telecommunication Switching Nodes", describes a telecommunication system using distributed parallel processors to control a distribution network.

As previously discussed, other methods of data transfer are provided in the prior art. One such method employs an information bus allowing only one message passing at a time. An example of this bus method is illustrated in U.S. Pat. No. 4,586,175, entitled "Method for Operating a Packet Bus for Transmission of Asynchronous and Pseudosynchronous Signals". This patent discloses a bus controlled by two bus controllers. U.S.

Pat. No. 4,363,093, entitled "Processor Intercommunications System", discloses a local area network intercommunications system between processors. Again, only one message will be allowed on the system at a time. U.S. Pat. No. 4,821,170, entitled "Input/Output System for Multiprocessors", also discloses a system providing two system buses, but not employing a switch to facilitate intersystem communication.

Other examples of bus type communication are illustrated in U.S. Pat. No. 4,704,606, entitled "Variable Length Packet Switching System". This patent discloses a packet switching system for variable length packets. U.S. Pat. No. 4,631,534, entitled "Distributed Packet Switching System", discloses a packet switching system where each port includes the intelligence to provide destination port and station addresses in the packets. U.S. Pat. No. 4,630,258, entitled "Packet Switched Multiport Memory N×M Switch Node and Processing Method", discloses a packet switching system using an N×M switch from N input ports to be routed to M output ports. The switch is centrally controlled.

U.S. Pat. No. 4,773,069, entitled "Robust Routed Tree Network", discloses a data transmission network including modems, and having at least two controllers interconnected to the modems.

Other general communication teachings illustrating a switch include *IBM Technical Disclosure Bulletin*, Vol. 25, No. 7A, Dec., 1982, pp. 3578-3582, entitled "Data Base Control and Processing System", discloses a host processor communicating with a plurality of satellite processors through a data switch matrix. The switch and the operation of the satellites are being controlled by the host processor. *IBM Technical Disclosure Bulletin*, Vol. 29, No. 7, Dec., 1986, pp. 3070-3072, entitled "Rotary Switch", discloses a rotary switch. *IBM Technical Disclosure Bulletin*, Vol. 30, No. 1, Jun., 1987, pp. 403-405, entitled "Dynamic Time Slot Assignment Architecture for a Digital Telephone Switch", discloses a single port providing access to a digital telephone switch system. *IBM Technical Disclosure Bulletin*, Vol. 11, No. 10, Mar., 1969, pp. 1231-1232, entitled "Interconnection Control Networks", discloses a multiply redundant switching arrangement for a digital computer.

All of the prior art previously discussed discloses the use of centralized control for the switching network. It is an object of the present invention to provide a distributed control across the ports connected to the switch to more cost effectively regulate the interconnection of the ports to the switch, and, thus, communication across the switch.

DISCLOSURE OF THE INVENTION

In accordance with the present invention a communications network is provided that includes a plurality of ports with each port connected to at least one data processing system element. A bus is provided that interconnects the ports. A matrix switch is provided that is connected to the ports and the bus connecting the ports. The matrix switch provides the capability to connect a communications channel between any two of the ports. Each of the ports includes control logic connected to the bus for communicating with other ports and the matrix switch to regulate the establishment of communications channels between ports.

BRIEF DESCRIPTION OF THE DRAWING

The foregoing and other objects, aspects and advantages of the invention will be better understood from the following detailed description of Best Mode for Carrying Out the Invention with reference to the figures listed below, in which:

FIG. 5B is an event diagram illustrating a disconnection between port A and port B;

BEST MODE FOR CARRYING OUT THE INVENTION

Figure 1:
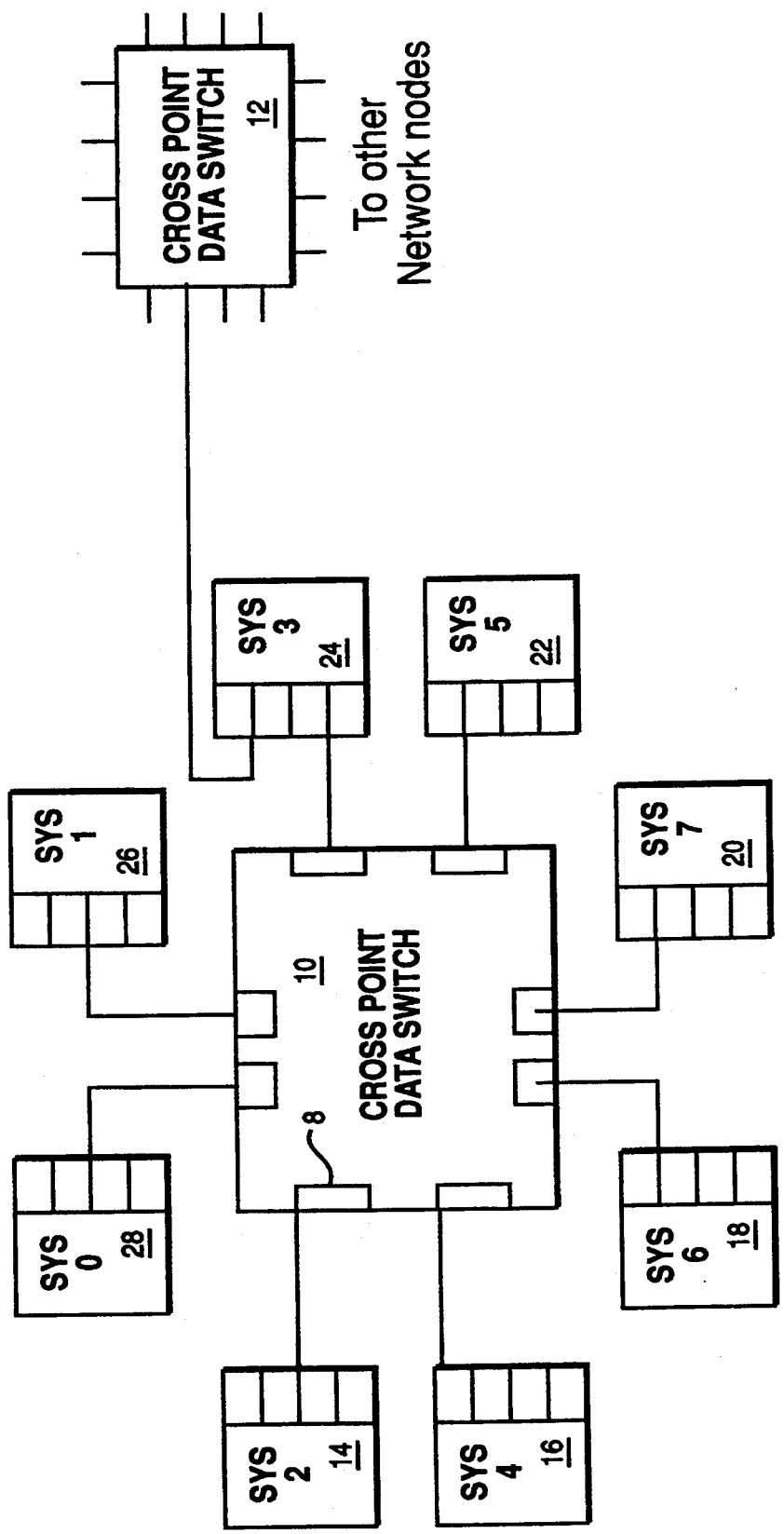
FIG. 1 is a block diagram illustrating eight systems connected to a first cross point switch and one connected to a second cross point switch.

FIG. 1 is a block diagram of a communications system that includes several systems 14, 16, 18, 20, 22, 24, 26 and 28 that are each connected to a cross point switch 10. Each of the systems, such as system 14, is connected to cross point switch 10 through a port 8. Note that each system, such as system 24, can be alternatively connected to additional cross point switches (such as switch 12) for redundancy or connectivity. In the preferred embodiment, system 14 and system 24 are RISC System/6000 workstations that are connected by a serial fiber optic channel to the cross point switch 10. In this preferred embodiment, each RISC System/6000 can include four ports to implement the serial link interconnections. An example of a protocol used with the serial link interconnection is ESCON (Enterprise System Connection for the IBM 3090 Enterprise System Serial Input/Output Channel). It should be understood in this preferred embodiment that when a system is to connect to another system to provide information to the second system, all information is provided through this serial link fiber optic channel. The originating system will send out a frame of information of up to 32 bytes to initially establish communications with the receiving system. After the first frame has been sent and received, establishing the connection through the cross point switch 10, this connection is maintained so that the originating system may continually pass additional frames of information to the receiving system until a disconnect frame has been sent to alert the receiving system and the switch 10 that it is being disconnected. In the preferred embodiment, the cross point switch is an N×N switch supporting N×N ports to provide simultaneous communication between connected ports and the systems connected to the ports.

Figure 2:
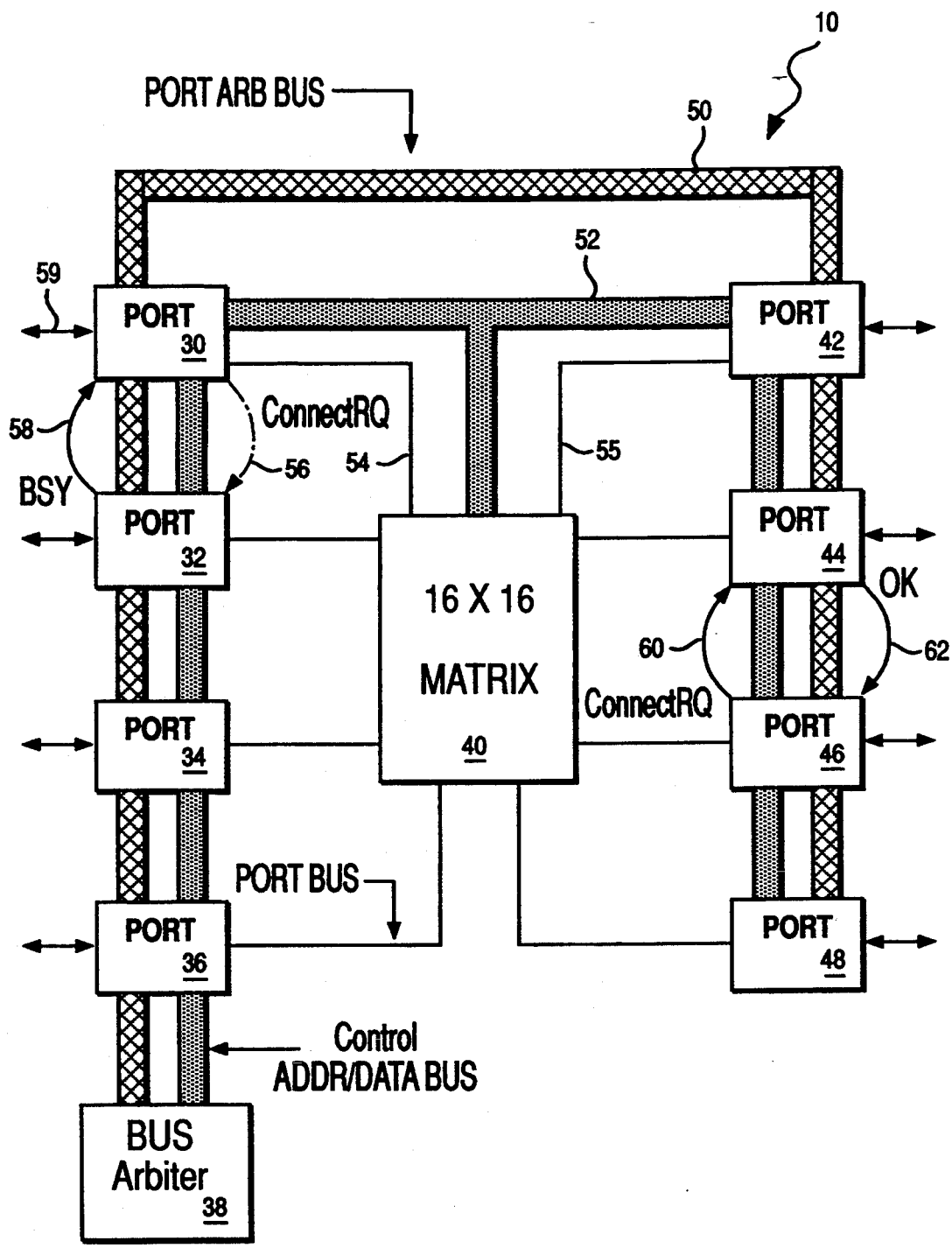
FIG. 2 is a block diagram illustrating the contents of a cross point switch.
Figure 4:
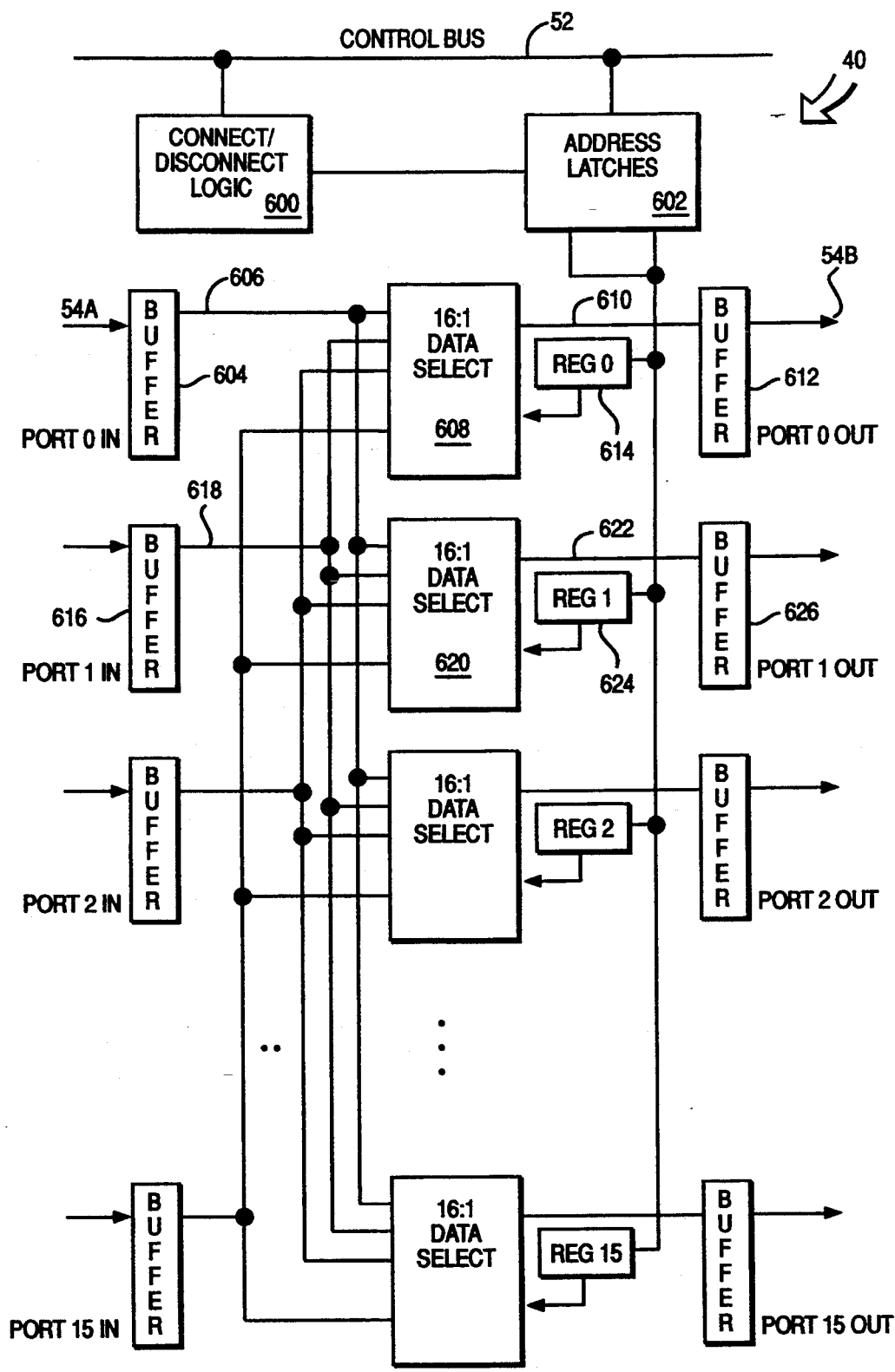
FIG. 4 is a block diagram of the cross point switch.

FIG. 2 is a block diagram of the cross point data switch 10. In the preferred embodiment, a 16×16 switch is provided. For this description only, eight ports of the 16 are shown. Each port 30 is connected to a port arbitration bus 50, port control bus 52 and data transfer lines (such as lines 54 and 55 for ports 30 and 42, respectively). Each of the ports are connected through these data lines to the 16×16 matrix switch 40. The matrix switch 40 can be an off-the-shelf part such as the GIGABIT Logic 10G051, which provides cross point interconnection between ports (with the exception of logic 600 and address latches 602, FIG. 4).

In the preferred embodiment, each port provides an optical-to-electrical conversion in order that the information is passed electrically between ports through the 16×16 matrix 40. Initially, a port, such as 30, may attempt a connection to another port, such as port 32. First, port 30 requests arbitration. That is, port 30 requests a grant on the arbitration bus 50 through the bus arbiter 38. Upon receiving a grant, a connect request is passed over the control bus 52 to port 32. A status is then received. In FIG. 2, an example is illustrated where port 30 is attempting to contact port 32 by sending a request symbolically indicated by the arrow 56. Port 32 sends a busy signal indicated symbolically by the dashed arrow 58 back to port 30 declining the transfer request. Note that during this initial attempt at port-to-port connection, the 16×16 matrix has not been accessed. This is possible by having the control of the switch mechanism distributed among the ports. In other words, it is only after confirmation is received that the data transfer can take place and the switch 40 is involved in the connection between the ports.

The matrix switch 40 is connected to the control bus 52. This may enable the matrix switch 40 to respond to commands directed to it. In the preferred embodiment, the only commands that are directed to the matrix switch 40 are those of a diagnostic nature. During normal operation, the matrix switch 40 merely monitors the control bus 52 and the control communication between ports to determine when connections are to be made or terminated. When connections are made, lines such as 54 are connected to lines such as 55 to allow for data transfers between ports such as port 30 and port 42 without requiring explicit commands to the switch from the ports or from some other control.

The disconnection operation is performed by the matrix switch 40 without any commands from the ports. The matrix switch 40 eavesdrops on the command bus 52 to determine when the disconnection is to be made by examining the commands for a disconnect on the control bus 52. When a termination frame is being sent from one system to another, the matrix switch 40 by monitoring the control bus 52 automatically determines the connection is to be broken; thus, saving time by not requiring a separate command protocol to tell the matrix switch to disconnect. This is important because the disconnection operation is a high priority, since further connections with either of these ports can only be made when this disconnection occurs.

Figure 3:
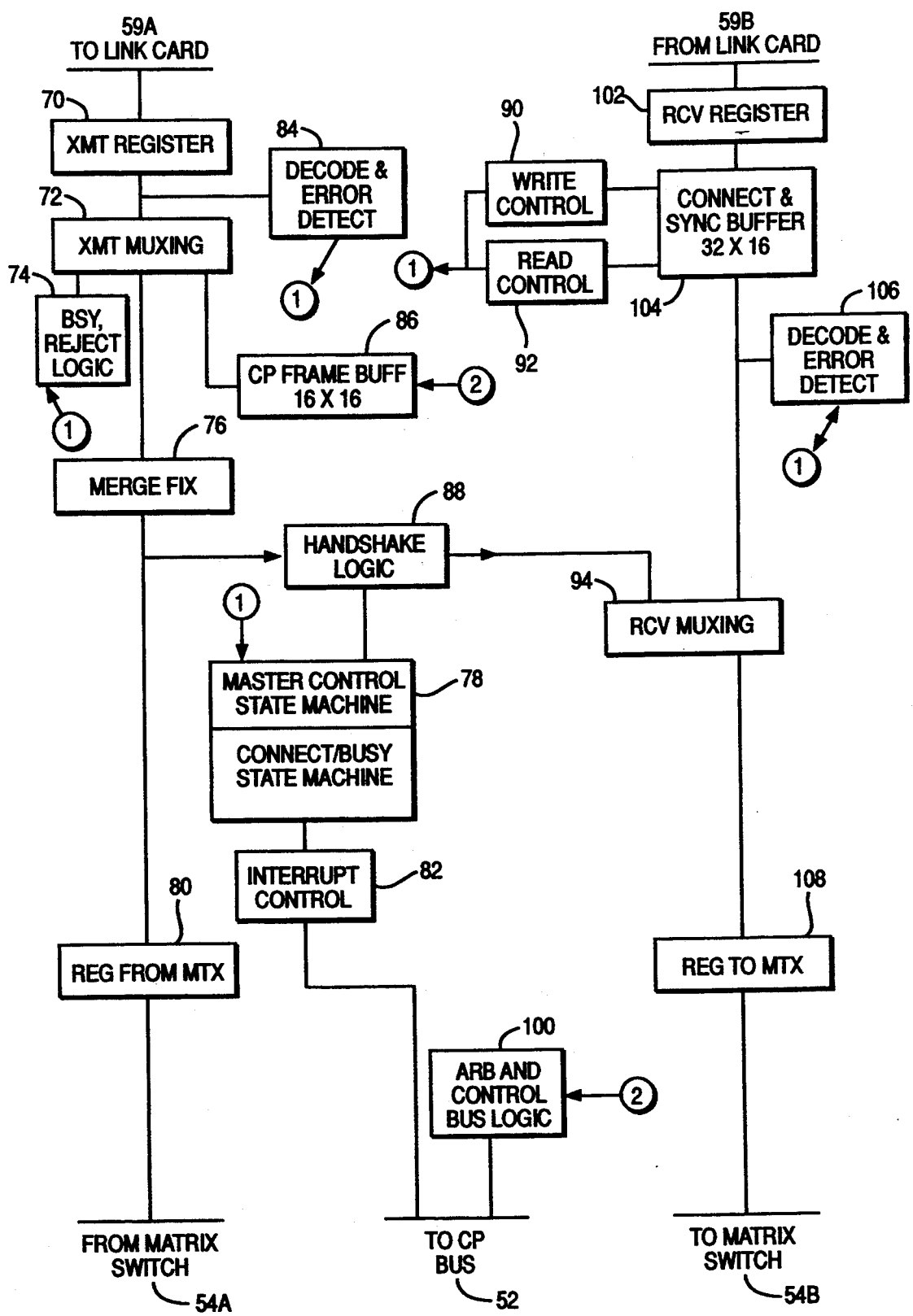
FIG. 3 is a block diagram illustrating the contents of a cross point switch port circuit.

FIG. 3 is a block diagram of the logic contained in each port, such as port 30. The master control state machine and connect/busy state machine 78 control the operation of the port logic. State logic 78 is connected to an interrupt control 82 that provides interrupts for error conditions to and from the control bus 52. The state logic 78 is further connected to the handshake logic 88. The handshake logic operation is of the type discussed in *IBM Technical Disclosure Bulletin*, Vol. 32, No. 6A, November, 1989, pp. 21–22, entitled "Method for Validating Dynamic Data Paths in a Data Switching Unit", herein incorporated by reference. When a frame is first received from a system, it is received over a bus 59B where it is initially latched a character at a time in a receive register 102. The contents of this register are then loaded into the connect/synchronization buffer 104, where write control or read control logic 90 and 92, respectively, together with state logic 78, determines whether buffer 104 acts as a pass-thru First-In/First-Out buffer or a capture buffer. The write control 92 determines where in the buffer 104 the data is to be written. The read control logic 90 determines from where in the buffer 104, the next character is to be read out. The decode and error detection logic 106 is also connected to the state logic 78 to signify any error conditions. If the frame is to be passed to another port, a request for connection is passed through the control bus. As discussed earlier, the arbitrator sends a request to the bus arbitrator 38 over bus 50 through the arbitration and control bus interface 100. Upon a grant, the port state machine 78 sends a connect request and evaluates the status received over the control bus 52 from the port to be connected. If the port to be connected is not busy, then the connection is automatically established by the matrix 40 and the data from the connect/synchronization buffer 104 is passed through register 108 onto the data line 54B to the matrix switch. The receive multiplexer 94 determines if data from the link 59B or the handshake logic 88 is to be loaded into register 108. Likewise, data being received from the matrix switch on line 54A passes through the register 80 through a merge logic circuit 76 which prevents block code errors through the transmit multiplexer 72 to the transmit register 70 to be passed out on bus 59A. Note that in the transmission side, both busy and reject logic 74 and decode and error detect logic 84 are provided for error conditions. The busy/reject logic 74 determines when a busy indication has been received from the control bus 52 and provides a busy frame on line 59A. Frame buffer 86 is provided to transmit previously specified frames indicating specific error conditions.

Figure 5A:
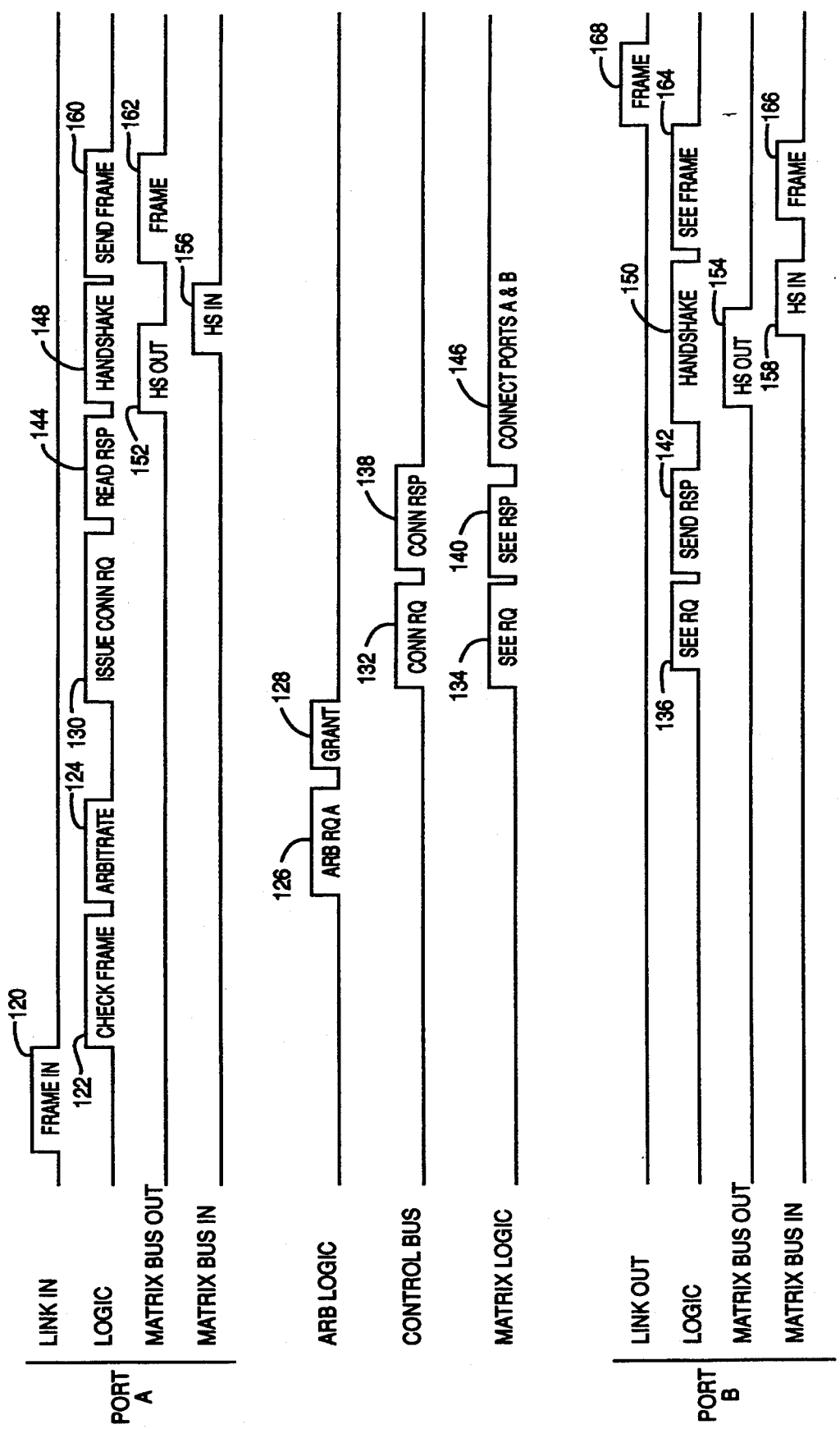
FIG. 5A is an event diagram illustrating the events between port A, port B and the cross point switch in establishing a link between port A and port B.

FIG. 5A is an event diagram illustrating an interconnection between port A and port B. In FIG. 5A, a frame is first received by a port on a bus (such as 59B) at event 120. At event 122, the port logic examines the frame and determines to establish a connection and, at event 124, to arbitrate for the control bus. The bus arbitrator 38 receives the request at event 126 and grants the request at event 128. At that time, the port A logic issues a connect request 130 which includes the port addresses involved on the control bus 52 indicated by event 132. The matrix logic 600, FIG. 4, observes this request at event 134, and latches the addresses of the port which are latched in latches 602 while the port B logic sees this request at event 136. The port B logic then sends a response 142, which is seen by the matrix logic 600 at event 140 over the control bus 52, as illustrated by event 138. This response is read by the port A logic at event 144. In this example, a successful connection is being performed. Therefore, the matrix logic 600 loads the port address from latches 602 to the registers such as 614 and 624 to enable the data select circuits 608 and 620 to connect internal bus 606 to internal bus 622. Port A logic then provides handshake signals with port B over the matrix bus, such as 54A and 54B. First the handshake out event 152 and 154 are provided from both ports and then from both ports the handshake in events 156 and 158 are provided back to the opposing ports. Note that the matrix logic has automatically connected ports A and B through the matrix switch 40. Finally, the frame is sent at event 160 out on the matrix bus event 162 to the matrix in line to port B 166 where the port logic examines the frame at event 164. This frame is then provided on the output of the link to the connected device at event 168.

FIG. 5B is an event diagram illustrating a disconnect operation. In this example, port A receives a disconnect frame from its connected device at event 200. This is passed to the matrix out bus event 202. This is received by port B on the matrix in bus at event 208 where the logic checks the frame at event 206 and the frame is dispatched to the linked device at event 204. The logic in port B then determines to arbitrate for the control bus at event 212 and is received by the bus arbiter 38 at event 210, which grants the request at event 214. The port B logic then issues the disconnect command at event 222, which is seen on the control bus at event 218, by the matrix logic at event 220, and by port A logic at event 216. Then the handshake is provided through the control bus at events 232 and 224 by ports B and A, respectively, through the matrix in and matrix out lines for the respective ports at events 226, 228, 234 and 236, respectively. The important event is when the matrix logic 40 automatically disconnects ports A and B at event 230 by eavesdropping on the command bus and having seen the disconnect command successfully issued.

It should be understood by those skilled in the art that by eavesdropping on the bus to see connect commands and disconnect commands, that further bus cycles are not required for controlling the switch, even though the switch operates in a manner to maintain an autonomous relationship between the ports.

Figure 6:
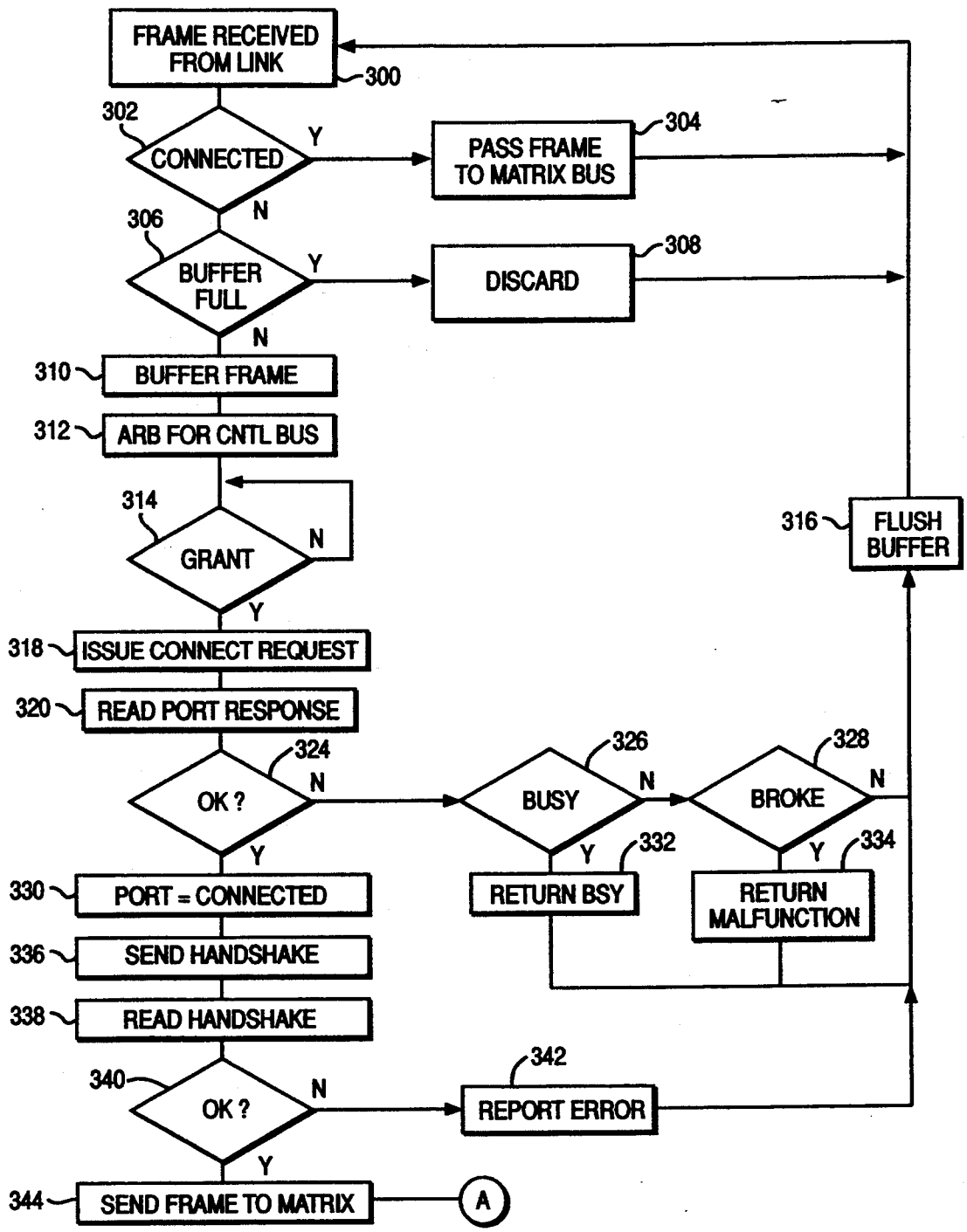
FIG. 6 is a flow chart illustrating the control of the port when a communications frame is received from its link.

FIG. 6 is a flow chart illustrating the state logic 78 of a port when it receives a frame. In block 300 a frame is received from the device connected to the link side of the port. The logic first determines if the frame is for an existing connection. This is an event when a previous frame has established the connection and this existing frame is merely one in a sequence of frames that is being passed through the existing connection. In step 304, the frame is passed through the existing connection to the matrix bus to the matrix switch. The control logic then returns to step 300 to wait for the next frame. However, if in step 302, the connection has not been previously established, the control logic determines if the buffer 104 is full. If so, the frame is discarded in step 308 and the control logic returns to wait for another frame. If the frame buffer is not full, the frame is placed in the buffer in step 310 and the control logic arbitrates for the control bus in step 312. In step 314, the logic waits for the grant to be received. At which time it proceeds to issue a connect request in step 318. In step 320, the control logic reads the requested port's response. The response is examined in step 324 to determine if it is busy (step 326), at which time a busy message is passed, or if the port indicates that it is malfunctioned (step 328), at which time a malfunction message is passed back in step 334. Returning to step 324, if the response is successful, the port is marked as connected in step 330 and the send handshake is started in step 336 through the matrix. When the receive handshake is received in step 338 it is examined in step 340. If it is not okay, an error report is issued in step 342, at which time the buffer 104 is flushed in step 316. Returning to step 340, if the handshake is completed successfully, the frame is then sent to the matrix switch 40 in step 324 and the logic proceeds to node A illustrated in FIG. 8 (which will be discussed later).

Figure 7:
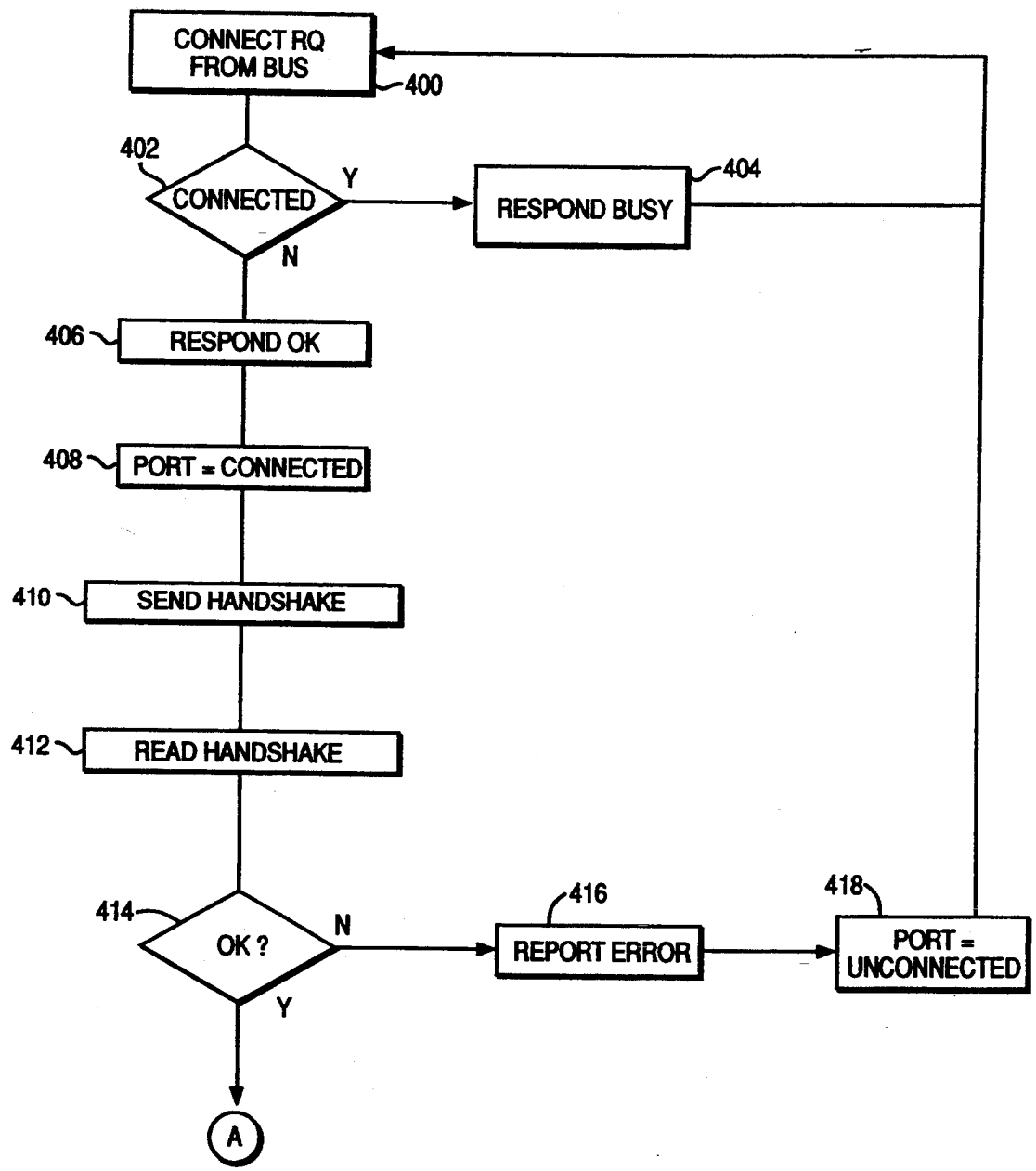
FIG. 7 is a flow chart illustrating the control of the port when a request is received from the communications bus.

In FIG. 7, a flow chart is provided that illustrates the operation of port control logic when a request has been received from the control bus. This occurs in step 400. At that time, the port determines whether or not it is connected in step 402. If so, the port responds in step 404 with a busy signal. If not, in step 406, the port responds that it can complete the connection. In step 408, the port stores an indication that it is connected, and, in step 410, provides the handshake. The response handshake is received in step 412 and is examined in step 414 to determine if it is okay. If not, then an error is reported in step 416 and the port marks itself as disconnected in step 418, returning to step 400. If, however, in step 414 the handshake response is okay, then the control logic proceeds to node A.

Figure 8:
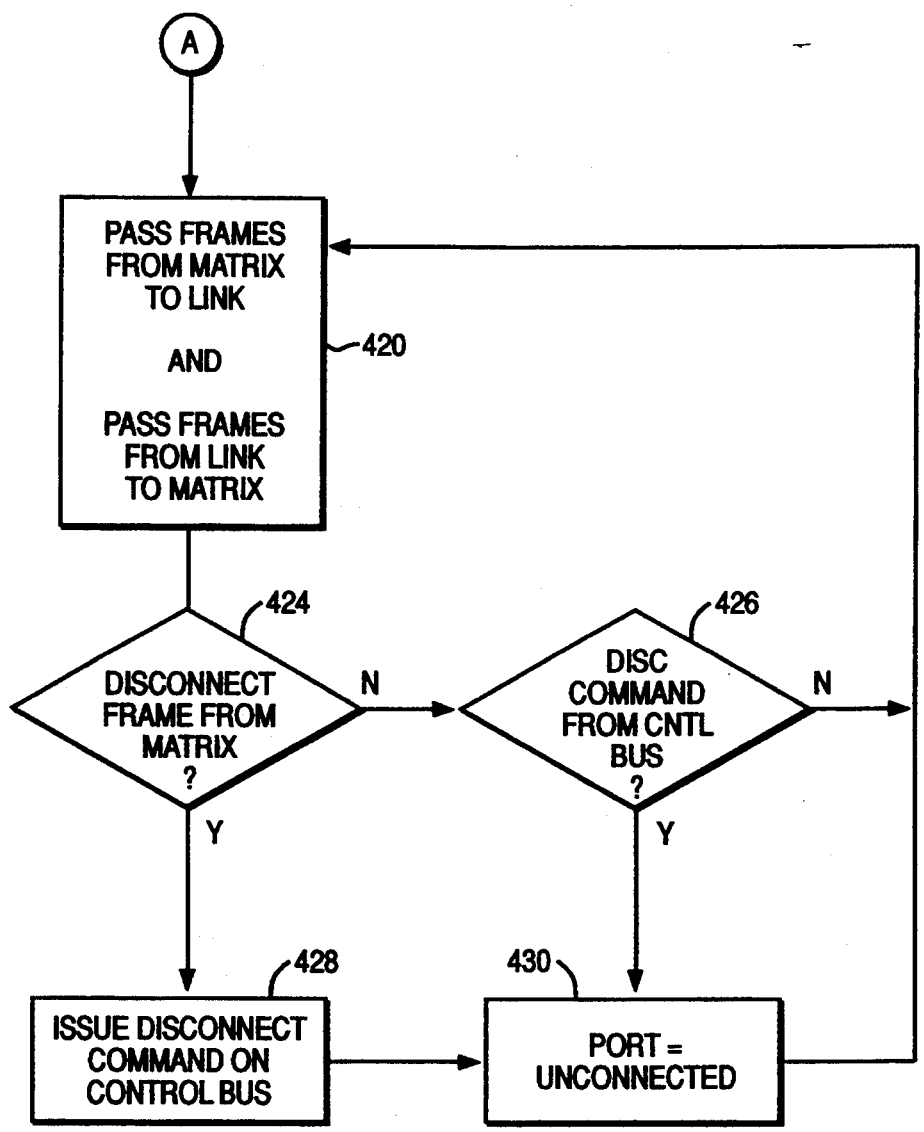
FIG. 8 is a flow chart illustrating the termination of communications by the port.

Node A is illustrated in FIG. 8 as connecting the logic in FIGS. 5 and 6 to step 420, which passes frames from the matrix to the link. Frames may also be passed from the link to the matrix, if required. In step 424, the port logic determines if a disconnect frame has been received from the matrix switch. If not, then the port logic determines in step 426 if a disconnect command has been received from the control bus. If not, then the port logic returns to step 420 to continue frame passing. Returning to step 424, if a disconnect frame has been received through the matrix switch, then, in step 428, an issue disconnect command on the control bus is made. The port is then marked as disconnected in step 430. Likewise, in step 426, if the disconnect command is received from the control bus, the port is marked disconnected in step 430.

Figure 9:
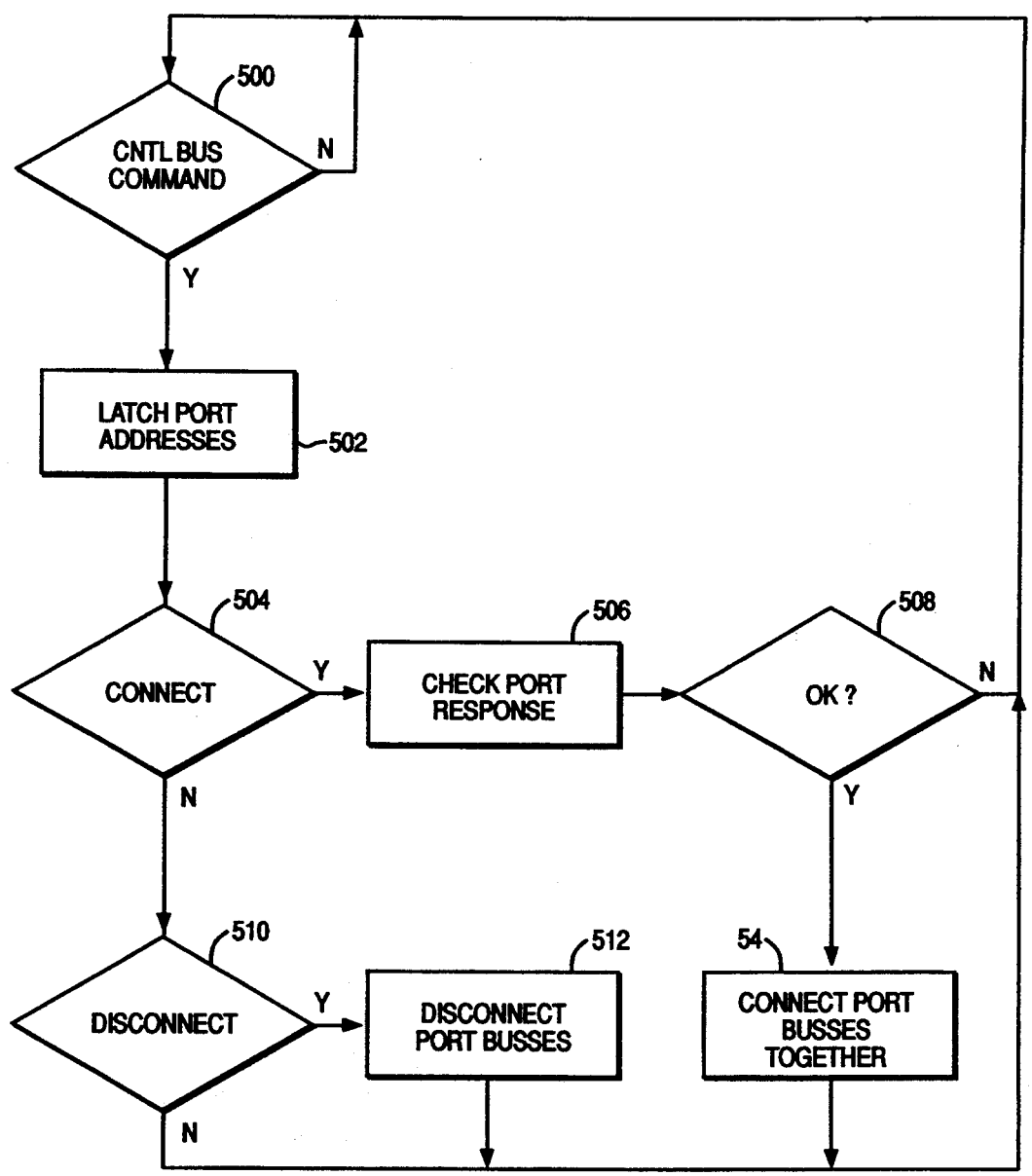
FIG. 9 is a flow chart illustrating the control of the matrix switch during the port-to-port communications.

FIG. 9 is a flow chart illustrating the control logic of the matrix switch 40. Note that the matrix switch 40 is a slave device that eavesdrops on the control bus and controls the switch connections accordingly. In step 500, the switch control logic determines if a command has been issued on the control bus. If not, it continues to wait. If a command is present, then the port addresses are latched in step 502. In step 504, the command is examined to see if it is a connect command. If so, in step 506, the port response is then monitored and checked. If the response is okay in step 508, then the bus connection between the ports is connected in step 504. Likewise, in step 510, the command is examined to see if it is a disconnect command, and, if so, then the port connections are disconnected in step 512.

It should be apparent to one of skill in the art that the eavesdropping logic of the matrix switch can also be used to control functions other than the mere connection or disconnection of devices. For example, the eavesdropping logic of the matrix switch can be used to determine when a specific event has occurred by examining information related to the connection of the two ports and for supervising the operation of autonomous devices such as preventing two consecutive connections to the same port or a disconnect operation to an unconnected port.

While this invention has been described with reference to the illustrated embodiment, this description is not intended to be construed in a limiting sense. Various modifications of the illustrated embodiment, as well as other embodiments of the invention will become apparent to those persons skilled in the art upon reference to this description. It is, therefore, contemplated that these appended claims will cover any such modifications or embodiments as fall within the true scope of the invention.

We claim:

1. A communications network comprising:
    a plurality of ports, each connected to at least one data processing system element;
    bus means interconnecting said ports for providing information transfer between said ports;
    matrix switch means connected to said ports and said bus means for latching an identifier of at least one of said ports prior to approval of a requested connection by monitoring communications between said ports on said bus means and for providing a direct communications channel between any two of said ports upon approval of said requested connection; and
    each port including control means connected to said bus means for communicating with other ports to immediately establish said direct communications through the matrix switch means for an undefined time interval.

2. A communications network according to claim 1 wherein each port includes logic connected to said bus to determine a communications state of any other of said ports.

3. A communications network according to claim 2 wherein each port includes means for receiving communications request from its connected data processing system element and means for communicating with another port via said bus means for establishing a communications channel through said matrix switch means.

4. A communications network according to claim 3 wherein said bus means includes an arbitration means for receiving bus access requests from ports and granting control on the bus means for port to port communications over said bus means.

5. A communications network according to claim 4 wherein each port includes means for requesting a communications channel through said matrix switch means to another port and means for receiving an acknowledgement from said another port indicating that such request has been granted.

6. A communications network according to claim 5 wherein said matrix switch means includes means for establishing a communications channel between the requesting port and the granting port.

7. A communications network according to claim 6 wherein each port is connected to said matrix switch means with two communications lines for two way communications between said matrix switch means and the connected port.

8. In a communications network having a plurality of ports each connected to at least one data processing element and each port connected to all other ports with a bus, said network further including a matrix switch interconnected to each port and said bus, a method for establishing a continuous communications channel between data processing elements connected to different ports comprising the steps of:
    (a) receiving by the port a request from a connected data processing element for said communications channel through a second port to a second data processing element;
    (b) sending said request for establishing said communications channel from said receiving port to said second port over said bus;
    (c) latching an identifier of at least one of said ports, by said matrix switch which monitors communications between said ports on said bus, prior to grant of said request by said second port; and
    (d) immediately establishing said communications channel through said matrix switch, which monitors communications between said ports on said bus, upon the grant of said request by said second port for an undefined time-interval.

9. A method according to claim 8 wherein step (b) includes the steps of (b1) requesting access to said bus and (b2) upon grant of said access, requesting through said bus access to said second port through said matrix switch.

10. A method according to claim 9 wherein step (c) further includes denying matrix switch access by said receiving port or said second port of any other requesting ports while the communications channel is established.

11. A communications network comprising:
    a plurality of ports, each connected to at least one data processing system element;
    bus means interconnecting said ports for providing information transfer between said ports;
    matrix switch means connected to said ports and said bus means for latching an identifier of at least one of said ports prior to approval of a requested connection by monitoring communications between said ports on said bus means and for providing a direct communications channel between any two of said ports upon approval of said requested connection; and
    each port including control means connected to said bus means for communicating only with other port control means to immediately establish said direct communications through the matrix switch means for an undefined time interval.

12. A communications network according to claim 11 wherein each port includes logic connected to said bus to determine a communications state of any other of said ports.

13. A communications network according to claim 12 wherein each port includes means for receiving communications request from its connected data processing system element and means for communicating with another port via said bus means for establishing a communications channel through said matrix switch means.

14. A communications network according to claim 13 wherein said bus means includes an arbitration means for receiving bus access requests from ports and granting control on the bus means for port to port communications over said bus means.

15. A communications network according to claim 14 wherein each port includes means for requesting a communications channel through said matrix switch means to another port and means for receiving an acknowledgement from said another port indicating that such request has been granted.

16. A communications network according to claim 15 wherein said matrix switch means includes means for establishing a communications channel between the requesting port and the granting port.

17. A communications network according to claim 16 wherein each port is connected to said matrix switch means with two communications lines for two way communications between said matrix switch means and the connected port.

* * * * *